Jan. 10, 1950     C. A. MOELLER     2,494,445

PONTOON

Filed Nov. 30, 1945

C. A. MOELLER
INVENTOR

BY Gifford S. Holmes

AGENT

Patented Jan. 10, 1950

2,494,445

UNITED STATES PATENT OFFICE 2,494,445

PONTOON

Constand A. Moeller, Orange, Conn., assignor to United Aircraft Corporation, East Hartford, Conn., a corporation of Delaware Application November 30, 1945, Serial No. 632,011

14 Claims. (Cl. 244—105)

This invention relates broadly to non-rebounding dampers, and more particularly to dampers for aircraft of the rotary wing type capable of vertical ascent.

More specifically, my device comprises a damping mechanism that may be built into pontoons of helicopters, for example, and act to prevent vibrations of the machine from first compressing a pontoon, and thereafter returning force back from the pontoon to the helicopter to continue such vibration. Hence, the device will afford protection against building up of forced vibrations to a degree resulting in instability for the helicopter when contacting the ground or water when the rotor or other moving part of the craft is in operation.

It is an object of the present invention to provide an improved damper for machine elements.

Another object is to provide a damper for aircraft to prevent undercarriage vibrations from acting in harmony or conjunction with at least the major modes of vibrations of other parts of the craft, to thereby inhibit forced vibration conditions.

Other objects reside in the details of construction and arrangement of parts, and will be either obvious or pointed out in the following specification and claims.

Figure 1:
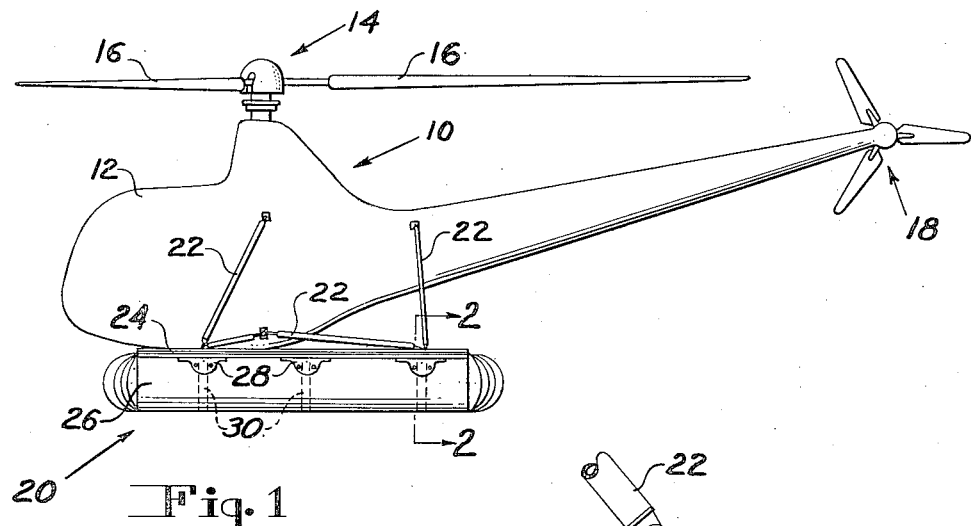
Fig. 1 is a side elevational view of a helicopter provided with flotation gear for sustaining the same on land or water or other surfaces, and having, incorporated in the floats thereof, improved damping devices for damping vibrations of rotating parts to prevent them from being transferred from the craft to the supporting surface and back again to create resonance.

Referring in detail to the drawings, in Fig. 1, a helicopter 10 comprises a body 12 containing an engine for turning a rotor 14 having blades 16 and a torque compensation rotor 18 for balancing the torque of the main rotor 14. Flotation gear generally indicated at 20 is carried upon braces 22 and one is disposed on each side of the helicopter. The flotation gear 20 is secured to the braces 22 by a beam 24 formed of pressed sheet metal and secured to a fabric and rubber bag 26 by brackets 28 to be described more fully below, which brackets are also secured to damping members 30 contained within the bag 26.

Figure 2:
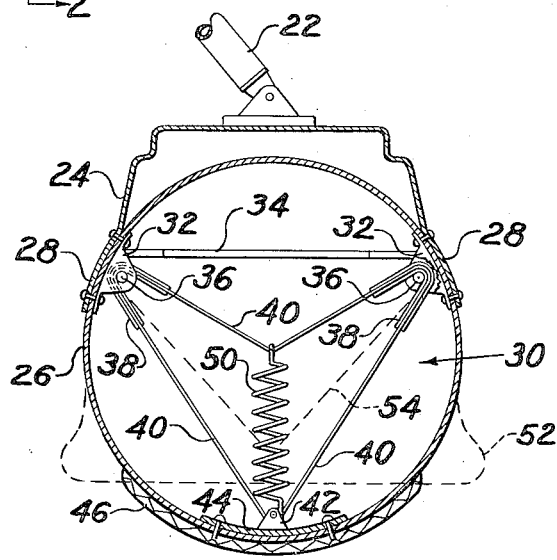
Fig. 2 is a sectional view taken along the lines 2—2 of Fig. 1.

In Fig. 2, the details of construction of the damping means 30 is shown. The beam 24 is provided with depending brackets 28 that are secured through the bag 26 to internal brackets 32, which brackets are spaced apart by a strut 34. The brackets 32 have pins 36 secured in ears in the brackets 32 over which pass friction members 38 carried by a band or cable 40. The legs of the cable 40 form a triangle, the sides of which pass down to the bottom of the bag 26 and are secured to brackets 42 mounted upon a strengthening flange 44 secured to the bottom of the bag 26 and a chafing strip 46 which prevents damage to the bag upon landing upon abrasive surfaces. The cable 40 is constrained into substantially the geometrical figure shown by a tension spring 50 which loops over the upper leg of the triangle formed by the cable 40 and is secured at its lower end to the bracket 42.

In operation, as the helicopter approaches the ground, the bag 26 will be in the extended position shown in full lines due to the pressure of the gas within the bag. At this time, the spring 50 will be extended because of this pressure and the cable 40 may be in substantially the position shown in solid lines. When the bag 26 contacts the ground with its chafing strip 46, the bag will assume a shape approximately like that shown by the dotted line 52, and the lower legs of the cable 40 will form to the geometrical figure substantially as shown by the dotted line 54. This motion may sometimes be modified by a lateral displacement. At such time, the spring 50 will be contracted. During contraction, the friction strips 38 will be pulled over the pins 36 substantially only by the action of the spring 50 so that the spring 50 will not resist compression of the gas within the bag but will only exert its force in overcoming the friction of the strips 38 with respect to the pins 36. As a tendency to reverse the direction of motion of the bottom part of the bag occurs, such as the normal rebound force, this tendency will then be resisted by the friction of the strips 38 upon the pins 36 against the tension of the spring 50, so that the rebound action will be highly damped and the force will not be fed back rapidly to the craft to build up oscillations. Relative lateral motion of bracket 42 due to oscillations of the craft 10 will likewise be damped by motion of the friction strips 38 over pivots 36.

Figure 3:
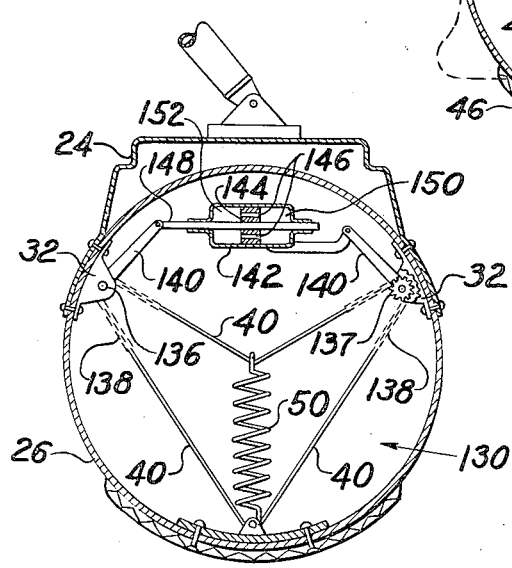
Fig. 3 is a sectional view similar to Fig. 2 but of a modification of the invention.

In Fig. 3, a modified structure 130 is shown within the bag 26. The brackets 32 are provided with trunnions 136 carrying sprockets 137 that mate with chains 138 connected in the cable or band 40 in place of the friction members disclosed in Fig. 2. The sprockets are connected with arms 140 which have pivoted at their uppermost ends a damper mechanism comprising a housing 142 containing a piston 144 having orifices 146, which piston is connected with a piston rod 148. As the bag 26 is compressed, the lower legs of the cable 40 will move upwardly so that the spring 50 will rotate the left hand arm 140 in a clockwise direction and the right hand arm 140 in a counterclockwise direction whereby a damping fluid, which may be air or other gas or oil or other liquid, contained in a right hand chamber 150 of the damper will pass through the orifices 146 to a left hand chamber 152. As constructed and arranged, the spring 50 can exert sufficient force in a given time of normal compression of the bag 26 to cause the damper to move as far as required during a normal compression period for the bag. As the bag tends to expand due to natural rebound action, the fluid in the damper will have to pass from the chamber 152 to the chamber 150 by energy received from the rebound force against the tension of the spring 50 so that the net result will be a highly damped action. It will be obvious that ball check valves may be utilized in cooperation with the orifices 146 to insure rapid deflection and a damped rebound of the float. Thus, this modification also will serve to damp vibrations and prevent them from being fed back from a supporting surface to the helicopter to prevent resonance conditions.

While I have shown and described two forms of my invention, and the application thereof to a helicopter, it will be understood that the damper could serve in other types of installations and for damping other machine elements without departing from the spirit of the invention. Therefore, I wish to be limited in my invention only by the spirit and scope of the following claims.

I claim:

1. Mechanism for damping vibrations in floats for helicopters or the like comprising, a flexible container for a compressible fluid, a support for said container, a pair of friction members within said container, a tension member secured to said container at a point or points spaced substantially equally from said members, said tension member passing from said point over said friction members and back to said point to form a loop, and a spring secured to said point of support at one of its ends and to a point of said tension member lying between said members at the other of its ends; said mechanism being operable to cause a force impressed upon said container to distort the same, compress said fluid, and cause the spring to contract and change the points of contact of said tension member with said friction members, and as the force is removed to cause the container to dissipate energy by restoring said points of contact to a predetermined position.

2. Mechanism for damping vibrations in floats for aircraft comprising, a flexible container for a compressible fluid, a support for said container, friction members within said container, a cable secured to said container at a point or points spaced from said members, said cable passing from said point through said members and back to said point to form a loop, and a spring also secured to said point of support at one of its ends and to a point of said cable lying between said members at the other of its ends; said mecha- nism being operable to cause a force impressed upon said container to distort the same, compress said fluid, and cause the spring to contract and change the points of contact of said cable with said members, and as the force is removed to cause the container to dissipate force by tensioning said spring against the resistance due to the friction of said members.

3. Alighting mechanism for aircraft comprising in combination, a frame for the aircraft, support means carried by said frame to contact the medium upon which the aircraft alights and to support the same upon the medium, and friction means for damping vibrations associated with said support means comprising spaced points of support having fixed surfaces and a tensioned cable forming a geometric outline with said points of support and slidable over said fixed surfaces for dissipating energy when said support means is moved relatively to the aircraft by changing the geometric outline more readily in one sense than in a second sense.

4. Motion damping means comprising, cable support means, a cable supported on said support means forming a geometrical figure, means for exerting a force tending to move adjacent sides of said figure towards each other, means acting in opposition to said force, and means for dissipating energy when said sides are moved.

5. Motion damping means comprising, spaced supports having cable engaging surfaces, cable means supported on said surfaces forming a closed geometrical figure, biasing means for exerting a force in a direction urging adjacent sides of said figure towards each other, fluid pressure means acting in opposition to said force, and means for dissipating energy when said sides are moved.

6. In combination with a member to be damped, motion damping means comprising, a cable, means securing said cable to the member, friction members spaced from said securing means for guiding said cable, and spring means secured to the member at one of its ends and to said cable at a point between said members at the other of its ends for tensioning said cable in a direction cooperable with a disturbing force acting upon said damping means.

7. Aircraft flotation gear comprising in combination, a hollow resilient float, and a friction damper device within said float connected at relatively movable spaced points thereof for damping motions of the float comprising, means having movable sides forming a geometrical figure, biasing means for exerting a force in a direction urging adjacent sides of said figure towards each other, means for resisting said force, and for dissipating energy when said sides are moved.

8. Aircraft flotation gear comprising in combination, a hollow resilient float, and a fluid damper device within said float connected at relatively movable spaced points thereof for damping motions of the float comprising, means having rotatable sides forming a geometrical figure, biasing means for exerting force on said figure, means acting in opposition to said force, and means for dissipating energy when said sides are moved.

9. Aircraft flotation gear comprising in combination, a hollow resilient float, laterally spaced pivotally mounted supports carried within said float, an intermediate support carried within said float, said supports being located in the same general cross sectional plane of said float, a fluid damper connected between said laterally spaced supports for damping relative movements of the latter about their pivots, a cable connecting all of said supports to form a closed geometrical figure, and means for tensioning said cable.

10. Motion damping means comprising, cable support means forming a geometrical figure, a cable supported on said support means, biasing means for exerting a force in a direction urging adjacent sides of said figure towards each other, means acting in opposition to said force, and fluid damping means for dissipating energy when said sides are moved.

11. Motion damping means comprising, cable means forming a closed geometrical figure, means for exerting a force tending to move adjacent sides of said figure towards each other, and frictionally engaging means engaging said cable and resisting said force.

12. Aircraft flotation gear comprising in combination, a hollow resilient float, motion damping means connected to said float at points laterally disposed from the vertical axis thereof and including frictionally engaging means for dissipating energy when said float is deflected.

13. Aircraft flotation gear comprising in combination, a hollow resilient float, motion damping means connected to said float at oppositely disposed points and including frictionally engaging means for dissipating energy when said float is deflected.

14. Flotation gear for aircraft, comprising in combination, a hollow resilient float having its longitudinal axis laterally disposed and substantially parallel to the longitudinal axis of said aircraft, a plurality of vibration dampers contained within said float and spaced along the longitudinal axis thereof comprising, means connected to said float at oppositely disposed points and including frictionally engaging means for dissipating energy.

CONSTAND A. MOELLER.

REFERENCES CITED

The following references are of record in the file of this patent:

UNITED STATES PATENTS

| Number | Name | Date |
|---|---|---|
| 1,241,622 | Grider | Oct. 2, 1917 |
| 1,255,787 | Phillips | Feb. 5, 1918 |
| 1,317,741 | Turnbull | Oct. 7, 1919 |
| 1,332,739 | Mallory | Mar. 2, 1920 |
| 1,337,579 | Amory | Apr. 20, 1920 |
| 1,445,486 | Cats | Feb. 13, 1923 |
| 1,471,560 | Langford | Oct. 23, 1923 |
| 1,522,457 | Ideus | Jan. 6, 1925 |
| 1,748,337 | Fox | Feb. 25, 1930 |
| 2,064,674 | Lugurg | Dec. 15, 1936 |
| 2,265,206 | Stampfl | Dec. 9, 1941 |

FOREIGN PATENTS

| Number | Country | Date |
|---|---|---|
| 571,607 | France | Feb. 6, 1924 |
| 664,414 | France | Apr. 23, 1929 |